United States Patent Office 3,539,361
Patented Nov. 10, 1970

3,539,361
METHOD OF IMPROVING CROCKING FASTNESS OF DYED CELLULOSE SAUSAGE CASING
Harold R. Coleman, Danville, Ill., assignor to Tee-Pak, Inc. a corporation of Illinois
No Drawing. Filed Jan. 15, 1968, Ser. No. 697,592
Int. Cl. A22c 13/00
U.S. Cl. 99—176
9 Claims

ABSTRACT OF THE DISCLOSURE

The overcoating of a dyed cellulose substrate, such as a cellulosic sausage casing, with a coating solution containing a water-soluble polymer having at least two reactive functional groups therein (e.g., gelatin, gum arabic, gum tragacanth, or egg albumin) and a difunctional or polyfunctional cross-linking agent (e.g., diisocyanates or polyepoxides, etc.), followed by heating and drying the coating to insolubilize the same, improves the crocking fastness and the adhesion of printing ink subsequently applied thereto. The polymer and cross-linking agent in the solution must be compatible, i.e. not reactive with water or with each other at ambient temperatures. A similar effect can be obtained by first coating the cellulose substrate with an aqueous solution of the water-soluble polymer and insolublizing the coating by treatment with a cross-linking agent in a separate step.

BACKGROUND OF THE INVENTION

This invention relates to a method of preventing dye rub-off or crocking, particularly with reference to clear, regenerated cellulose and fibrous cellulose sausage casings for bolognas and the like.

As substitute for natural sausage casings, it is known to produce synthetic cellulose sausage casings from a cellulosic solution such as viscose. The casings are dyed, dried, printed and then rewetted prior to stuffing.

Large diameter sausages, such as bolognas and the like, are produced by a method in which a meat emulsion is stuffed into a wetted cellulose casing and the sausage then smoked and cooked. For some types of sausages, the cellulose casings used are a transparent or clear, regenerated cellulose tubular film. In certain types of sausages, however, where close size control of the sausage product is required, cellulose casings are used which contain a fibrous reinforcement. Close size control is required so that the meat packer may slice the sausage into slices of predetermined thickness and diameter for prepackaging. The slices must be accurately sized so that a given number of slices weigh a precisely predetermined amount. The meat packer prepackaging sliced sausage meats requires that a given number of slices weight exactly one pound or some other preselected weight.

Cellulose casings used in the preparation of various sausages are normally prepared by extruding a viscose solution through a die having an annular orifice into a coagulating and regenerating bath. The regenerated cellulose tubing is washed to remove by-products and residual acid or salts from the coagulating and regenerating bath. The casing is then impregnated with a softening agent, such as glycerin. If there is any tendency to carry excess acid from the coagulating-regenerating baths, the casting may be passed through a 1% solution of sodium hydroxide as a premercerizing treatment.

When casings are prepared having a fibrous reinforcement, a tube of fibrous paper (preferably a long fiber hemp paper) is formed and passed adjacent to the annular orifice of the extrusion die so that the paper tube is impregnated and coated with viscose. The impregnated and coated tube is passed through a coagulating and regenerating bath to produce regenerated cellulose within the fibrous paper and on the surfaces of the paper as a substantial coating. The final product, known in the trade as fibrous casing, consists of about 35–40% fibrous paper and 60–65% regenerated celllulose and softening components. The fibrous casing is washed to remove impurities in a manner similar to that described for the unreinforced or clear casing.

The preparation of colored casings has long presented problems in the art of casing manufacture. While casings are made primarily of regenerated cellulose and thus can be colored or dyed with dyes of the type used in the dyeing of cotton and rayon, it has not been practical to use fabric or yarn dyeing techniques in the preparation of colored casings. Generally, it is not practical to provide dyeing tanks of a size sufficient to permit the soaking of casings in dyes for extended periods of time. The preparation of colored casings, particularly those with fast colors, has been accomplished as part of the general processing of the casing at the time of manufacture. When a casing is dyed in a process which is in series with the production of the casing, the casing is moved at a relatively high rate of speed through the dye bath, as compared to the speed of dyeing of fabrics and yarns, with the result that it has proved quite difficult to produce desired colors that do not vary substantially in different lots of casings.

There have been attempts to dye cellulose casings on a commercial scale using vat dyes and naphthol dyes. In fact, some major manufacturers use vat dyes extensively in the coloring of cellulosic casings. Vat dyes produce colors which are somewhat reproducible and which are relatively fast. However, there are disadvantages in the handling and application of vat dyes. Napthol dyes are especially useful for in-line dyeing of sausage casings and have been used in the production of colored casings in various colors ranging from reds and yellows through dark browns.

Fibrous and nonfibrous cellulose sausage casing is, therefore, described herein as dyed with naphthol dyes although other dyes can be employed. Naphthol dyes are formed by the reaction of the sodium salt of a phenolic or enolic compound, called a naphthol, with an aryl diazonium compound which is called a fast color salt. Naphthols differ widely in substantivity, a measure of the degree of affinity which a naphthol has for a substrate.

The cellulosic casing (either unreinforced or fibrous casing) is dyed by two-step naphthol dyeing by first being passed from the wash tank into an alkaline solution of a single naphthol. See U.S. patent application Ser. No. 423,318, filed Jan. 4, 1965, now U.S. Pat. No. 3,383,443.

From the naphthol bath, the casing is continuously fed through an aqueous solution of a single fast color salt maintained at a temperature less than about 20° C. (preferably less than 15° C.) and buffered with a suitable acid-salt mixture (e.g., sodium acetate-acetic acid) to a pH of about 2.5–5.9. The casing has a residence time in the fast color salt ranging from about 2–300 seconds, preferably about 3–20 seconds.

The so-called permanent naphthol dyeing on cellulose sausage casing is subject to some varying degree of dye rub-off or crocking particularly upon rewetting prior to stuffing. The pigment particles of a non-substratum dye adhere by virtue of polar groups and similar surface-active forces to the cellulose casing. During the subsequent processing of the cellulose casing, loose dye particles may rub off, particularly during stuffing of the wetted casing with meat emulsion or in the handling of the wet stuffed sausage. This is objectionable due to the discoloration of uniforms and hands of employees preparing sausages since the dye is difficult to clean from the operator's hands and uniform.

After dyeing, the sausage casing is dried and imprinted with a flexographic or lithographic (oil base) ink. The application of flexographic printing to the printing of regenerated cellulose sausage casings has been generally unsatisfactory as a result of the poor adhesion of the ink to the relatively moist surface of the sausage casing. Also, flexographic printing has not proved sufficiently adherent to sausage casings to withstand the abuse encountered in presoaking and stuffing of the casing. Oil base printing inks have been used successfully in the printing of regenerated cellulose sausage casings. The printing inks have been selected for superior properties of adhesion toward regenerated cellulose having a high glycerin and water content. The drying oil printing inks which have been used comprise a pigment or mixture of pigments, a vehicle drying by oxidation, and a drying agent or mixture of drying agents. Vehicles drying by oxidation consist mainly of a drying oil or mixture of drying oils, such as unsaturated animal or vegetable or synthetic oils which oxidize and polymerize when exposed to the air in a thin film, leading ultimately to a solid and tough but flexible film. The drying oil of the printing ink vehicle may be linseed oil, tung oil, perilla oil, oiticicia oil, soybean oil, and synthetic drying oils of petroleum origin. Chemically modfied drying oils such as dehydrated castor oil or drying animal oil modified to free it from objectionable odor are also used. In most cases, the drying oils used in printing inks are bodied oils. Drying oil printing inks present two problems in the printing of regenerated cellulose sausage casings. Firstly, the ink must dry to the touch rapidly so that it will not block when the printed pieces of casing are stacked one on another. Secondly, the printing ink which has been dried to the touch must dry entirely by forming a chemical and/or physical bond to the substrate, i.e., clear regenerated cellulose or fibrous casings. The solution of the first problem has been relatively easy since the speed of drying, i.e., the formation of a dry, nonblocking surface layer or film, can be controlled and/or accelerated by appropriate selection of drying agents such as various metal naphthenates, which are well known in the printing art for improving the drying characteristics of oil base printing inks. The improvement of adhesion of the ink to the substrate has been much more difficult and has not had a satisfactory solution.

Coating the cellulose sausage casing over the dyed surface prior to drying with a film of methyl or ethyl cellulose, sodium carboxymethyl cellulose, acrylamide or protein polymers (or similar polymers), was found to reduce dye rub-off. However, ink adhesion upon imprinting the casing subsequent to drying was unsatisfactory since the print was not anchored to the substrate and the films were water dispersible. Upon rewetting the casing by soaking prior to stuffing, the ink tended to come off the casing. This was particularly aggravated by the stretching of the sausage casing during stuffing.

STATEMENT OF OBJECTS AND FEATURES

Accordingly, it is an object of this invention to improve dye fastness on cellulose sausage casing, particularly wet fastness and rubbing (crocking) fastness.

Another object of this invention is to improve printing ink adhesion to cellulose sausage casing, particularly to wet and stretched casing.

A feature of this invention is the aftertreatment of a dyed cellulose sausage casing with a coating composition to prevent dye rub-off of the casing.

Another feature of this invention is the coating of a dyed cellulose sausage casing with a coating composition containing a water-soluble polymer having at least two reactive functional groups therein (e.g., gelatin, gum arabic or gum tragacanth) and a difunctional or polyfunctional cross-linking agent (e.g., diisocyanates or polyepoxides) to prevent dye rub-off of the casing and improve adhesion of ink imprints on the casing.

Other objects and features of this invention will become apparent from time to time throughout the specification and claims as hereinafter related.

SUMMARY OF THE INVENTION

The crocking of cellulose sausage casings or other cellulosic substrates may be prevented by coating the substrate, subsequent to dyeing and preferably before drying and printing, with a composition containing a water-soluble or water-dispersible (hereinafter generically referred to as "water-soluble") polymer having at least two reactive functional groups therein (e.g., gelatin) and a cross-linking agent containing at least two functional groups (e.g., epoxy or isocyanate groups). The polymer and cross-linking agent in the solution must be compatible, i.e. not reactive with water or with each other at ambient temperatures. A similar effect can be obtained by first coating the cellulose substrate with an aqueous solution of the water-soluble polymer and insolubilizing the coating by treatment with a cross-linking agent in a separate step.

DESCRIPTION OF THE PREFERRED EMBODIMENTS

In the manufacture of cellulosic meat casings, viscose is extruded through an annular die at a linear rate of 15–75 feet per minute into a coagulating and regenerating bath usually consisting of ammonium sulfate, sodium sulfate, and sulfuric acid. In some cases, the viscose is extruded first into a coagulating bath of ammonium sulfate and a small amount of sulfuric acid and then into a regenerating bath containing a higher proportion of sulfuric acid. The cellulosic tube which is formed continuously removed and washed to remove reactants from the coagulating and/or regenerating bath and by-products which are formed during the regeneration of the cellulose. When a fibrous casing is manufactured, the system is modified to insert a fibrous paper, preferably a long fiber hemp paper, into the casing. The fibrous paper is continuously formed into a tube and passed through a die having an annular orifice which extrudes viscose to impregnate and coat the paper. The impregnated and coated paper is then passed through a coagulating and regenerating bath to produce a paper-reinforced casing which consists of about 35–40% paper and 60–65% regenerated cellulose and softening or plasticizing ingredients. In the production of both clear (unreinforced) casings and fibrous casings, one or more of the wash baths (preferably following the dyeing baths) is provided with glycerin or other suitable plasticizing ingredients to soften the regenerated cellulose product.

In carrying out this invention, a clear, regenerated cellulose sausage casing or a fibrous casing is continuously manufactured, dyed, and treated with a coating composition to improve crocking fastness and the adhesion of subsequently applied printing ink. In cases where the primary goal is improved ink adhesion, the coating may be applied at the first station of a multi-station printing press or may be applied by a separate in-line coating operation at the input to the printing press or may be applied in a separate off-machine coating operation completely separated from the printing of the casing. The thickness of the coating is not especially critical and may be from a fraction of a mil to several mils in thickness. After the coating is applied and heat-dried, the oil base or flexographic ink is applied in one or more steps, with intermedate drying of the ink in the case of multicolor printing. The printed casing is then air-dried. The oil base and flexographic inks applied to the coated cellulose casing adhere more tenaciously to the casing through subsequent processing. Imprints made over the coated casing have superior adhesion to the casing and do not come off when soaked in water at 80° C. (or even boiling water) for ten minutes or as a result of the stretching which occurs when the casing is stuffed. In particular, flexographic inks can be employed without using a diisocyanate or similar primer coating. Furthermore, dye-rub-off due to wetting, stretching and rubbing is minimized.

Coating cellulose casing prior to drying and printing with a film of methyl cellulose, sodium carboxymethyl cellulose, acrylamide or protein polymers (or similar polymers) was found to reduce dye rub-off from miscellaneous and fibrous cellulose sausage casing for bolognas. However, ink adhesion was unsatisfactory upon re-wetting the casing prior to stuffing since the print was not anchored to the substrate and films were water dispersible. After coating, the casing is dyed, dried and printed.

However, with the use of a suitable cross-linkage agent and a suitable film-forming polymer or colloid, a water-insoluble film was formed on the substrate which reduced dye rub-off and improved ink adhesion. The cross-linking agent must have two or more reactive groups per molecule. The polymer must have at least two reactive functional groups therein and should be water soluble.

Water-soluble, polyfunctional, polymeric organic materials which are used in aqueous solution for coating cellulosic casings or other cellulosic substrates include a variety of materials such as gelatin, egg albumin, natural gums, such as gum tragacanth or gum arabic starch derivatives, high amylose starch, soluble cellulose ethers such as methyl cellulose, hydroxyethyl cellulose, carboxymethyl cellulose, polyvinyl alcohol, polyacrylic acid, etc. Gelatin, however, is the preferred polymer because of its low cost, high viscosity and adaptability to printing.

The cross-linking agents which are applied to insolubilize the polyfunctional, polymeric coating materials include a variety of cross-linking agents having two or more reactive functional groups per molecule, such as isocyanate, isothiocyanate, epoxy, chloroepoxy, acyl halide, acylamide, ester, ketene, imino, halogen, or acid anhydride groups (including compounds having mixtures of such functional groups). Typical compounds which may be used as cross-linking agents include, but are not limited to, the following:

Diisocynates—The diisocyanate of dimer acid, 4,4'-methylene bis(cyclohexyl isocyanate)
Diisothiocyanates—The diisothiocyanate of dimer acid, 4,4-methylene bis(cyclohexyl isothiocyanate)
Polyepoxides—Butadiene diepoxide
Chloroepoxides—The reaction product of epichorohydrin and a polyamide
Acyl halides—adipyl chloride, and sebacyl chloride
Acyl amides—adipyl amide, sebacyl amide
Polyesters—dimethyl sebacate, dimethyl suberate
Polymeric ketenes—dimeric acid diketene
Polyhalides—1,6-dichlorohexane
Di-imides—1,6-diimidohexane
Polyfunctional nitriles—1,6-dicyanohexane, tetracyanoethylene
Polyfunctional acid anhydrides—pyromellitic acid anhydride In applying the cross-linking agents to the various coating materials, the less reactive cross-linking agents are applied in admixture with the polymeric, polyfunctional coating material in aqueous solution. After the cellulosic substrate is coated with the solution, the drying of the product is effective to cause the cross-linking agent to react with and cross-link and insolublize the water-soluble, polyfunctional material and, in some cases, cross-links the coating to the substrate. When the water-soluble, polyfunctional material and cross-linking agent are used together in aqueous solution, it is necessary to select compatible materials, i.e. polyfunctional polymers and cross-linking agents which are not reactive with each other or with water at ambient temperatures. Where more reactive cross-linking agents are used, the cellulosic substrate or casing may first be passed through an aqueous solution of the water-soluble, polyfunctional, polymeric coating material and then cross-linked in a separate treating step.

TESTING PROCEDURE

The dye rub-off (cracking resistance) of casings treated in accordance with this invention was evaluated on an Atlas CM-1 Crockmeter (Atlas Electric Devices Company). The crockmeter squares were dampened with water and rubbed across the casing for 50 revolutions on the maximum stroke. The squares were visually compared with an untreated casing as a control.

The ink adhesion of cellulose casings treated in accordance with this invention was evaluated by placing printed samples of casing in an 80° C. water bath for one hour. Cellophane tape was then applied to the print and removed quickly. The amount of ink adhering to the tape indicated the quality of the ink adhesion. A control was also used for comparison.

Having generally described the invention, the following examples are included for purposes of illustration so that the invention may be more readily understood and are in no way intended to limit the scope of the invention unless otherwise specifically indicated. All amounts are on a weight basis unless otherwise specified.

EXAMPLE 1

A fibrous casing was continuously prepared and dyed a light yellow-red (known in the trade as Suntan), coated, heat-dried, imprinted and air-dried.

A fibrous casing was continuously prepared as described above by passing fibrous paper past a viscose extrusion die into a coagulating and regenerating bath. The casing was continuously prepared at a rate of 40 feet per minute and fed through various wash and dye baths. The casing is washed and subsequently plasticized with glycerin following the coagulating and regenerating baths, and if there is any tendency to carry excess acid from the coagulating-regenerating baths, the casing may be passed through a 1% solution of sodium hydroxide as a pre-mercerizing treatment.

The casing is fed through a naphthol solution at a rate of 40 feet per minute and has a residence time of 6 seconds in the solution. The naphthol solution contains 0.5–200 g. per liter of Naphthol AS–RL, 0.75–1.5 g. per liter of ethylene-diaminetetraacetic acid (or other chelating agent), an anionic wetting agent, and sufficient sodium hydroxide to produce a 0.03–1.2 N solution. The naphthol solution is preferably agitated continuously by bubbling air therethrough.

The casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion of the naphthol in the casing. The solution contains preferably 12 g. per liter of Fast Red AL and is buffered with 2–20 g. per liter of acetic acid and 15–5 g. per liter of sodium acetate to produce a pH in the range from 2.5–5.9. This solution also contains a small amount of a dispersant (Diazopon SS 837), a chelating agent (e.g., ethylenediaminetetraacetic acid), and 15–20 g. per liter of sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, coated in accordance with this invention, heat-dried, imprinted and air-dried.

A satisfactory coating solution consists of 0.5% (by weight) Kymene 557, 0.75% gelatin, and 10% glycerol in an aqueous solution. Kymene 557 is a trade name of Hercules Powder Company, Wilmington, Del., for the water-soluble, polymeric polyepoxide which is the reaction product of epichlorohydrin and a polyamide prepared by reacting adipic acid with diethylenetriamine. Kymene 557 is obtained as a pale amber liquid of 10% solids content, having a density of 1.026, a viscosity of 30 centipoises at 25° C. (Brookfield), a pH of 5.0, and a nitrogen content (Kjeldahl) of 12.8% (dry solids basis). The above aftertreatment solution was applied by dipping to several pieces of dyed fibrous casing (regenerated cellulose casing reinforced with a hemp fiber paper) as a thin layer, and dried.

A portion of the coated casing was evaluated for dye rub-off on the Atlas CM–1 Crockmeter as described above in the testing procedure. An uncoated, dyed, control casing was also evaluated at the same time. The coated casing was found to give a relatively minor amount of dye crocking. The untreated control exhibited substantial crocking under the conditions of the test.

Next, a first down oil base ink was applied to the coated surface and allowed to dry. The ink used was Alden and Ott 5650 white first down ink which comprises a mixture of pigment, metallic drier (e.g., cobalt naphthenate), alkyd resin and a resin hardener (e.g., cellulose acetate butyrate) in a drying oil (e.g., linseed oil, tung oil, etc.). The first down ink imprint, upon drying (about 6 days) could be subjected to immersion in boiling water for 10 min. and could be stretched in the same manner as a stuffed sausage casing without the dye or ink imprint coming off. When fibrous casing was dyed without aftertreatment in accordance with this invention and then imprinted, dye and ink imprint rub-off was noticeable upon boiling in water, rubbing and stretching.

In other experiments, the casing aftertreated as described above was imprinted with a second down yellow oil base ink (Sleight-Hellmuth 5221) and also with a third down blue oil base printing ink (I.P.I. 93524). In each experiment, a non-treated fibrous casing was run as a control. In each case, the coated casing exhibited superior resistance to dye crocking and to ink imprint rub-off as compared to the untreated control.

EXAMPLE 2

In this example, a gelatin-Kymene coating was used to protect a clear, unreinforced, regenerated cellulose casing from dye crocking and to give improved ink adhesion upon printing.

The clear, unreinforced, regenerated cellulose casing was prepared in a conventional manner and coated with a coating composition essentially identical to that used in Example 1 except that the gelatin content was increased from 0.75% to 1.5%.

Large diameter cellulosic meat casings (known in the trade as Miscellaneous casings) are prepared by extruding viscose through a die having an annular orifice into a regenerating and coagulating bath. The casing may be manufactured at speeds ranging from 15–45 feet per minute. The viscose is extruded into a coagulating and regenerating bath containing ammonium sulfate, sodium sulfate, and sulfuric acid. In some experiments, the coagulating and regenerating baths are separated, the coagulating bath being primarily salts and the regenerating bath primarily acid. The casing is washed to remove acids, salts, and by-products and may be passed through a dilute caustic premercerizer bath to neutralize any acid carry-over from the last wash.

The casing is passed successively through a naphthol bath and a fast color salt bath as described in connection with the dyeing of fibrous casing in Example 1 above.

The reaction conditions and concentrations of naphthol and fast color salt were substantially the same for the dyeing of unreinforced, regenerated cellulose casing as were used for fibrous casing. A reddish orange color (known in the trade as Fawn) was produced using Naphthol AS–OL in the naphthol solution and Fast Orange RDN in the fast color salt bath.

The aftertreatment solution prepared above was applied to a clear, regenerated cellulose casing (Tee-Pak Miscellaneous casing) as a thin layer, and dried. Portions of the dyed and coated casing were evaluated for dye crocking in comparison with dyed untreated control casings using the Atlas CM–1 Crockmeter. The coated casing exhibited substantial resistance to dye crocking in comparison with the untreated control.

Next, the coated casing was dried and imprinted with an oil base printing ink, viz., Sleight-Hellmuth 5221 second down yellow. The second down ink imprint, upon drying (about 4 days) could be subjected to immersion in boiling water for 10 min. and could be stretched in the same manner as a stuffed sausage casing without the dye or ink imprint coming off. When non-fibrous casing was dyed without aftertreatment in accordance with this invention and then imprinted, dye and ink imprint rub-off was noticeable upon boiling in water, rubbing and stretching.

EXAMPLE 3

In this example, a coating composition containing a natural gum as the coating polymer is used in protecting clear, regenerated cellulose casing against crocking.

A coating composition is prepared consisting of 1.0% Kymene 557, 1.0% gum tragacanth or gum arabic, and 10% glycerol in aqueous solution. The solution is used to coat a clear, unreinforced, regenerated cellulose casing substantially as described in Example 2.

Large diameter cellulosic meat casings (known in the trade as Miscellaneous casings) are prepared by extruding viscose through a die having an annular orifice into a regenerating and coagulating bath. The casing may be manufactured at speeds ranging from 15–45 feet per minute and, in some cases, as high as 75 feet per minute. The viscose is extruded into a coagulating and regenerating bath containing ammonium sulfate, sodium sulfate, and sulfuric acid. In some experiments, the coagulating and regenerating baths are separated, the coagulating bath being primarily salts and the regenerating bath primarily acid. The casing is washed to remove acids, salts, and by-products and may be passed through a dilute caustic premercerizer bath to neutralize any acid carry-over from the last wash.

The casing is passed successively through a naphthol bath and a fast color salt bath as described in connection with the dyeing of casings in the previous examples.

The reaction conditions and concentrations of naphthol and fast color salt were substantially the same as for the dyeing of casings in the previous examples. A reddish yellow color (known in the trade as Amber) was produced using Naphthol AS–OL in the naphthol solution and Fast Orange GGD in the fast color salt bath. The aftertreatment solution prepared above was applied to several pieces of clear, regenerated cellulose casing (Tee-Pak Miscellaneous casing) as a thin layer, and dried. The treated cellulose casing, together with untreated controls, was evaluated for dye crocking using the Atlas CM–1 Crockmeter. As in the previous examples, the coated casing showed only a very minor amount of dye crocking while the dye crocking of the uncoated casing was substantial.

Next, the coated casing was dried and imprinted with an oil base printing ink, viz, I.P.I. 93524 third down blue. the uncoated control was run. The difference in dye and ink imprint rub-off under conditions similar to the previous examples was apparent. The coated casing exhibited a marked resistance to dye crocking and a substantial improvement in ink adhesion as compared to the untreated control.

In other experiments, Alden and Ott 5650 first down white oil base printing ink and Sleight-Hellmuth 5221 second down yellow printing ink were applied over the coated casing. A control was run for each experiment. Under identical test conditions, the difference in dye and ink imprint rub-off between the treated casing and control for each experiment was noticeable. The coated casing exhibited a marked resistance to dye crocking and a substantial improvement in ink adhesion as compared to the untreated control.

EXAMPLE 4

In this example, both clear and fibrous casing were dyed, coated and imprinted on commercial equipment to test the effectiveness of the coating procedure of this invention on a commercial basis.

A series of runs were made on commercial dyeing and commercial printing equipment to test the effectiveness of the coating treatment of this invention. A coating solution was prepared consisting of an emulsion of 0.5% Dow Epoxy Resin 661, 1.0% gelatin, 12.5% methylethyl ketone, 0.5% Tween 65, and 85.5% water.

Dow Epoxy Resin 661 is a trade name of Dow Chemical Company, Midland, Mich., for a diepoxide cross-linking agent having an epoxide value of 661. Tween 65 is a trade name of Atlas Chemical Industries, Wilmington, Del., for polyoxyethylene sorbitan tristearate having 20 polyoxyethylene units per molecule. The coating solution was put into a coating applicator machine. The solution was applied to both clear, regenerated cellulose casing (Tee-Pak Miscellaneous casing) and fibrous casing by the coating applicator in line with a Young printing press. The casing was coated with the applicator subsequent to dyeing and drying in accordance with Example 2 by being passed beneath a drying lamp, and then fed through the Young Press to apply a first down ink, viz, Alden and Ott 5650 first down white oil base ink. In these experiments, the first half of each experiment was printed on the Young press with the coating applied subsequent to dyeing, and the second half of the experiment was printed without the coating.

After drying (about 2 days for the imprinted coated fibrous casing and about 4 days for the imprinted coated nonfibrous regenerated celluluose casing), the coated casings had excellent dye fastness and ink adhesion under the test conditions of the previous examples. A stretch curve analysis of the coated casings versus the corresponding uncoated casings revealed that the change in stretch characteristics was negligible. Also, there was no degradation of the casings as a result of the coating or the printing applied on the casings.

EXAMPLE 5

In this example, a series of experiments are set forth utilizing several different emulsion-type coatings for protecting dyed casing against crocking and improving ink adhesion for printed casing.

A satisfactory coating system of the emulsion type employing a diisocyanate as the cross-linking agent consists of 2% of a spray dried product obtained by reacting neutralized viscose (see U.S. Pat. 3,291,789) with chloroacetic acid, 0.1% DDI 1410 and 0.015% Igepal CO–630, dissolved in water.

Igepal CO–630 is a trade name of General Aniline and Film Corporation, New York, N.Y., for an alkylphenoxy (ethyleneoxy)ethanol.

DDI 1410 is a trade name of General Mills of Kankakee, Ill., for a water-stable, long-chain, aliphatic diisocyanate synthesized from dimer acid.

Another satisfactory coating composition of the emulsion type employs formaldehyde as the cross-linking agent. Formaldehyde can be used as a cross-linking agent (instead of DDI 1410, in the previous composition) if the pH of the aqueous solution is less than 7 and preferably 1–3. An ion exchange column is employed to adjust the pH to this value before applying the coating solution.

Still another satisfactory coating composition of the emulsion type employs epichlorohydrin as the cross-linking agent.

Such a composition consists of 0.75% gelatin, 0.1% epichlorohydrin, 10% glycerol and 89.15% water.

Each of these three coating compositions was substituted as a coating composition for the casings (both clear and fibrous), dyed and coated in accordance with the procedure of Example 2. Each of the coated casing samples, when tested on the Atlas CM–1 Crockmeter, had substantially improved resistance to dye crocking as compared to untreated control casings.

Several pieces of the coated casing were printed in a flexographic printing press in separate runs using different types of conventional flexographic printing inks. Flexographic printing inks consist generally of a resin and pigment dissolved in an alcohol free ester or in methylethyl ketone. The printing inks used in these experiments were Flexo-Tuf (a polyamide base ink), Plio-Lox (an acrylic base ink), and ICI cellulose ink (a nitrocellulose base printing ink).

When the coated casings were imprinted with each of the above-mentioned flexographic printing inks, the imprint was allowed to dry. A control was run for each ink (casing not coated). The differences in crocking fastness and ink adhesion under the tests of Example 1 were noticeable. The coated casings have a substantial resistance to dye crocking and exhibit improved ink adhesion as compared with the untreated controls.

EXAMPLE 6

This example illustrates the coating of cellulosic casings in a two-step process to provide improved crocking resistance and improved printing ink adhesion.

Clear, regenerated cellulose meat casings (Tee-Pak Miscellaneous casing) is passed through a solution of 1.5% gelatin to provide a gelatin coating thereon. The coated casing is partially dried and then passed through a saturated solution of carbonyl chloride in benzene. Next, the casing is dried in a heated air stream at a temperature of about 105° C. During drying, the carbonyl chloride cross-links and insolubilizes the gelatin coating.

The coated casing when tested on the Atlas CM–1 Crockmeter exhibits substantially improved resistance to dye crocking as compared to untreated dyed control casing. Likewise, when the coated casing is printed with lithographic or flexographic inks, the adhesion of the ink to the casing is substantially improved in the case of the coated casing as compared to the untreated controls.

EXAMPLE 7

This example illustrates the coating of cellulosic casings in a two-step process to provide improved crocking resistance and improved printing ink adhesion.

Clear, regenerated cellulose meat casings (Tee-Pak Miscellaneous casing) is passed through a solution of 1.5% gelatin to provide a gelatin coating thereon. The coated casing is partially dried and then passed through a saturated solution of oxalyl chloride in ether. Next, the casing is dried in a heated air stream at a temperature of about 105° C. During drying, the oxalyl chloride cross-links and insolubilizes the gelatin coating.

The coated casing when tested on the Atlas CM–1 Crockmeter exhibits substantially improved resistance to dye crocking as compared to untreated dyed control casing. Likewise, when the coated casing is printed with lithographic of flexographic inks, the adhesion of the ink to the casing is substantially improved in the case of the coated casing as compared to the untreated controls.

EXAMPLE 8

This example illustrates the coating of cellulosic casings in a two-step process to provide improved crocking resistance and improved printing ink adhesion.

Clear, regenerated cellulose meat casings (Tee-Pak Miscellaneous casing) is passed through a solution of 1.5% gelatin to provide a gelatin coating thereon. The coated casing is partially dried and then passed through a saturated solution of succinyl chloride in ether. Next, the casing is dried in a heated air stream at a temperature of about 105° C. During drying, the succinyl chloride cross-links and insolubilizes the gelatin coating.

The coated casing when tested on the Atlas CM–1 Crockmeter exhibits substantially improved resistance to dye crocking as compared to untreated dyed control casing. Likewise, when the coated casing is printed with lithographic of flexographic inks, the adhesion of the ink to the casing is substantially improved in the case of the coated casing as compared to the untreated controls.

EXAMPLE 9

This example illustrates the coating of cellulosic casings in a two-step process to provide improved crocking resistance and improved printing ink adhesion.

Clear, regenerated cellulose meat casings (Tee-Pak Miscellaneous casing) is passed through a solution of 1.5% gum arabic to provide a gum arabic coating thereon. The coated casing is partially dried and then passed through a saturated solution of carbonyl chloride in benzene. Next, the casing is dried in a heated air stream at a temperature of about 105° C. During drying, the carbonyl chloride cross-links and insolubilizes the gum arabic coating.

The coated casing when tested on the Atlas CM–1 Crockmeter exhibits substantially improved resistance to dye crocking as compared to untreated dyed control casing. Likewise, when the coated casing is printed with lithographic or flexographic inks, the adhesion of the ink to the casing is substantially improved in the case of the coated casing as compraed to the untreated controls.

EXAMPLE 10

This example illustrates the coating of cellulosic casings in a two-step process to provide improved crocking resistance and improved printing ink adhesion.

Clear, regenerated cellulose meat casings (Tee-Pak Miscellaneous casing) is passed through a solution of 1.5% gum tragacanth to provide a gum tragacanth coating thereon. The coated casing is partially dried and then passed through a saturated solution of oxalyl chloride in ether. Next, the casing is dried in a heated air stream at a temperature of about 105° C. During drying, the oxalyl chloride cross-links and insolubilizes the gum tragacanth coating.

The coated casing when tested on the Atlas CM–1 Crockmeter exhibits substantially improved resistance to dye crocking as compared to untreated dyed control casing. Likewise, when the coated casing is printed with lithographic or flexographic inks, the adhesion of the ink to the casing is substantially improved in the case of the coated casing as compared to the untreated controls.

While this invention has been described fully and completely with special emphasis upon several preferred embodiments, it is to be understood that within the scope of the appended claims this invention may be practiced otherwise than as specifically described herein.

I claim:

1. In the manufacture of regenerated cellulose sausage casings wherein the casing is naphthol dyed while in the gel cellulose state and subsequently dried, the improvement which comprises coating the cellulose casing subsequent to dyeing and prior to drying with a film of a water-soluble, film-forming polymeric organic compound having at least two reactive functional groups and reacting said polymeric organic compound of the resultant coating with a cross-linking agent having at least two functional groups reactive with said reactive functional groups of said polymeric organic compound to cross-link and insolubilize said polymeric organic compound of said coating and provide on the ultimately produced dried regenerated cellulose casing a water-insoluble dye crocking-resistant surface coating receptive to an oil base or a flexographic ink.

2. A process in accordance with claim 1 in which said polymeric organic compound is gelatin, egg albumen, hydroxyethyl cellulose, carboxymethyl cellulose, polyvinyl alcohol, a natural gum, sodium cellulose xanthate, polyacrylic acid, a starch derivative, or amylose starch.

3. A process in accordance with claim 1 in which said cross-linking agent contains at least two functional groups selected from the group consisting of

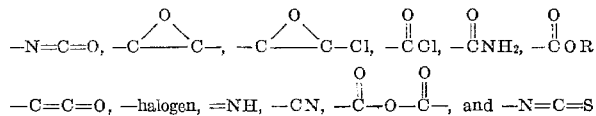

4. A process in accordance with claim 3 in which said cross-linking agent is 4,4-methylene bis (cyclohexylisocyanate) or a long-chain aliphatic diisocyanate derived from dimer acid.

5. A process in accordance with claim 3 in which said cross-linking agent is a water-soluble, polymeric polyepoxide which is the reaction product of epichlorohydrin and the polyamide prepared by reacting adipic acid with diethylenetriamine.

6. A process in accordance with claim 1 in which the casing is contacted with an aqueous solution of said water-soluble, polymeric, organic compound containing said cross-linking agent dissolved or dispersed therein and then dried at a temperature up to about 150° C. sufficient to cause said cross-linking agent to react with said water-soluble, polymeric, organic compound to insolubilize the same.

7. A process in accordance with claim 1 in which said casing is first contacted with an aqueous solution of said water-soluble, polymeric, organic compound and subsequently treated with said cross-linking agent to insolubilize a coating on the casing.

8. A process in accordance with claim 1 in which the coated casing is imprinted on said water-insoluble coating with an oil base or a flexographic ink.

9. A dyed regenerated cellulose sausage casing coated with an insoluble coating comprising a water-soluble, polymeric, organic compound having at least two reactive functional groups rendered insoluble by cross-linking prepared by the method of claim 1.

References Cited

UNITED STATES PATENTS

| | | | |
|---|---|---|---|
| 1,870,408 | 8/1932 | Dreyfus | 117—144 |
| 3,220,848 | 11/1965 | Himmelmann | 117—62.2 X |
| 3,245,810 | 4/1966 | Heiss | 99—175 X |
| 3,303,051 | 2/1967 | Paul | 117—144 X |
| 3,316,120 | 4/1967 | Vitalis | 117—144 X |

FOREIGN PATENTS

| | | |
|---|---|---|
| 98,385 | 7/1961 | Netherlands. |
| 679,775 | 2/1964 | Canada. |
| 1,013,954 | 5/1952 | France. |

FRANK W. LUTTER, Primary Examiner

R. HALPER, Assistant Examiner

UNITED STATES PATENT OFFICE
CERTIFICATE OF CORRECTION

Patent No. 3,539,361          Dated   November 10, 1970

Inventor(s)   Harold R. Coleman

It is certified that error appears in the above-identified patent and that said Letters Patent are hereby corrected as shown below:

Column 1, line 54, "weight" should read -- weigh --; lin 64, "casting" should read -- casing --. Column 2, line 6, "celllulose" should read -- cellulose --. Column 4, line 33, after "formed" insert -- is --. Column 5, line 9, "casinge" should read -- casing --; line 14, "cross-linkage" should read -- cross-linking --; line 46, "epichorohy-" should read -- epichlorohy- --. Column 6, line 5, "cracking" should read -- crocking --. Column 8, line 62, "the" should read -- An - Column 11, line 5, "of", first occurrence, should read -- or Signed and sealed this 30th day of May 1972.

(SEAL)
Attest:

EDWARD M. FLETCHER, JR.          ROBERT GOTTSCHALK
Attesting Officer                Commissioner of Paten